United States Patent [19]

Hammerquist

[11] Patent Number: 5,280,294
[45] Date of Patent: Jan. 18, 1994

[54] PASSIVE MONOPULSE RANGING TO A NON-COOPERATIVE EMITTER AND NON-EMITTING OBJECT

[75] Inventor: Earl L. Hammerquist, Thousand Oaks, Calif.

[73] Assignee: ITT Corporation, New York, N.Y.

[21] Appl. No.: 756,207

[22] Filed: Jul. 18, 1985

Related U.S. Application Data

[63] Continuation of Ser. No. 555,231, Nov. 25, 1983, abandoned.

[51] Int. Cl.$^5$ ............................................. G01S 3/02
[52] U.S. Cl. .................................... 342/453; 342/125; 342/146
[58] Field of Search .................. 342/13, 125, 126, 127, 342/146, 398, 450, 451, 453, 458

[56] References Cited

U.S. PATENT DOCUMENTS

4,438,439 3/1984 Shreve ................................ 342/398

Primary Examiner—Theodore M. Blum
Attorney, Agent, or Firm—Arthur L. Plevy; Patrick M. Hogan

[57] ABSTRACT

A radar system for passive determination of range to a non-cooperative scanning radar, to a non-emitting object illuminated by the scanning emitter and between scanning emitter and illuminated object entirely from the passive location. The radar equipment at the passive location includes a passive array with beam forming and switching matrix to provide output signals separately on the basis of angular discrimination, for each of the object and emitter. Resolver circuits respond to the angle between emitter and object vector, the incremental time between direct emitter reception and reflected echo from the object as well as to emitter scan rate and instantaneous pointing angle. Algorithms for the emitter range, object range and range between emitter and object are given.

8 Claims, 3 Drawing Sheets

PASSIVE MONOPULSE RANGING TO A NON-COOPERATIVE EMITTER AND NON-EMITTING OBJECT

This application is a continuation of the U.S. patent application Ser. No. 555,231 filed on Nov. 25, 1983, now abandoned.

BACKGROUND OF THE INVENTION

1. Field of the Invention

The invention relates generally to radar system passive ranging, and more specifically to systems providing substantially instantaneous ranging from parameters determinable entirely at a passive location.

2. Description of the Prior Art

Known methods for passive location of objects include concepts generally identified as triangulation, tri-lateration and bistatic radar. All of these rely on prior knowledge of two or more points in space to resolve the location of an object in question. In this description, the terms "object" and "target" are both used to refer to a non-transmitting (non-emitting) object such as a friendly or non-cooperating aircraft.

The triangulation concept presumes two known receiver locations for separate measurement of angle to an emitting object, and resolvers are computers or determining location from those separate measurements.

The tri-lateration method uses three or more time-of-arrival measurements from separate known positions to locate an emitting object.

The classical bistatic radar employs knowledge of the transmitter and receiver locations, pointing angle of the transmitter and time-difference-of-arrival along a direct path, vis-a-vis that along an indirect path, to locate a non-emitting object.

It is highly desirable to have the capability for location of both emitting and non-emitting objects having only knowledge of the measurement platform instantaneous location and the measurements which can be made internally and passively at any given instant in tune.

The manner in which the invention provides a novel combination for passive rapid measurements not requiring a priori knowledge of positions except for the passive measurement equipment itself is disclosed.

The manner in which the invention addresses the shortcomings of the prior art and the aforementioned needs will be apparent as this description proceeds.

SUMMARY OF THE PRESENT INVENTION

It may be said to have been the general objective of the invention to provide ranging information in respect to non-cooperating scanning pulse radar equipment and objects or targets illuminated thereby wholly passively from a passive measurement radar system. The apparatus according to the invention includes resolvers for measuring the angle to a non-emitting object from said passive location using reflected energy from the non-cooperating pulse scanning transmitter (emitter) and also by determine the angle to the said emitter from said passive location. An angle between said emitter and a line from the emitter to the reflecting object is calculated by measuring the emitter beam passage, determining its period and projecting the pointing angle with respect to the line connecting the radar emitter and the passive measurement antenna. These angles and the time difference of arrival obtained by measuring arrival times of energy via the direct path and the indirect path is the only information required to locate the radar emitter and/or the non-emitting object.

The details of two conceptually equivalent embodiments will be understood as this description proceeds. Although conceptually equivalent, the implementation of the two embodiments differs as will be realized from the description following.

DETAILED DESCRIPTION OF THE PREFERRED EMBODIMENT

Figure 1:
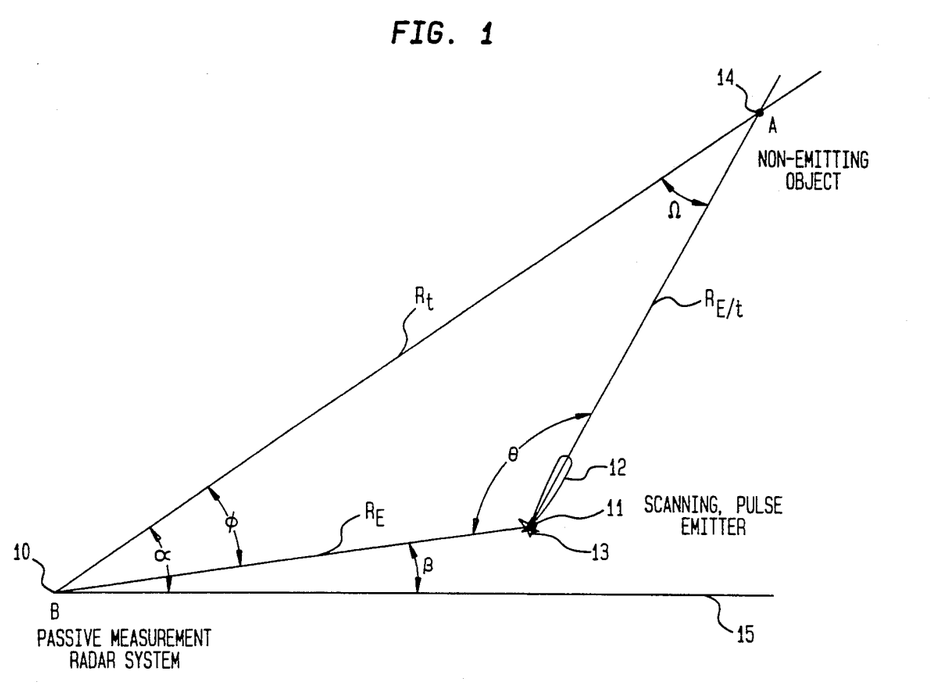
FIG. 1 is a geometric depiction of the spatial situation among the locations of the passive radar measurement equipment according to the invention and the non-cooperative emitter and target.

Referring now to FIG. 1, the geometry of ranging according to the invention is illustrated. A passive measurement radar system 10 according to the invention is located at point B and has an angular receiving capability at least in excess of the angle $\alpha$. A line 15 is the angular reference and may be, for example the boresight of the antenna system associated with radar 10. The scanning, pulsed surveillance radar (emitter) 11 is located at point C. This radar has a beam antenna pattern 12 with a usual plurality of side lobes 13. This beam is shown directed along the range line $R_{E/t}$, i.e., the range from the emitter to the non-emitting object. The range line $R_1$ will be seen to be the range to the non-emitting object A from the passive measurement radar system 10 and, similarly, the range line $R_E$ represents the bearing of emitter 11 as see from point B and with respect to the angle reference line 15.

It will be seen that the angular values capable of measurement directly from the passive measurement radar system lo at point B are the angles $\alpha$ and $\beta$. From those measurements, certain relationships become immediately obvious as follows:

$$\phi = |\alpha - \beta|$$

$$\theta = 180° - \phi - \Omega$$

$$\Omega = 180° - \theta - \phi$$

or $$\Omega = 180° - \theta - |\alpha - \beta|$$

$$\Delta t = 1/C(R_{E/t} + R_t - R_E)$$

where C is the speed of light.

Directly emitted energy from emitter 11 facilitates the measurement of the angle $\beta$, however, the measurement of the angle $\alpha$ depends on reflected energy from a non-emitting object 14. The angle $\theta$ is calculated by measuring the passage of emitter beam 12 to determine its period and by projecting the pointing angle with respect to $R_E$. Those angles and the time-difference-of-arrival $\Delta t$ obtained by measuring arrival times of energy arriving via the direct path $R_E$ and the indirect path $R_t$ is the only information required to locate the radar emitter and/or the non-emitting object (points C and A, respectively).

There are essentially two principal variations under which the passive measurement radar system 10 according to the invention may be required to operate. One of these will be identified as Case I, in which the scan rate of the non-cooperating emitter 11 is substantially constant through 360° as would be the case with a conventional Pulse Position Indicator (PPI) surveillance radar. Derivation of the location algorithms for Case I is as follows:

From the Law of Sines:

$$\frac{R_E}{\sin \Omega} = \frac{R_{E/t}}{\sin \phi} = \frac{R_t}{\sin \theta} \tag{1}$$

Solving for $R_{E/t}$ and $R_t$ in terms of $R_E$ $$R_{E/t} = \frac{R_E \sin \phi}{\sin \Omega} \tag{2}$$

$$R_t = \frac{R_E \sin \theta}{\sin \Omega} \tag{3}$$

The definition of time-difference-of-arrival is:

$$\Delta t = \frac{1}{C}(R_{E/t} + R_t - R_E) \tag{4}$$

Substituting for $R_{E/t}$ and $R_t$ and collecting terms:

$$\Delta t = \frac{R_E}{C}\left(\frac{\sin \phi + \sin \theta - \sin \Omega}{\sin \Omega}\right)$$

Thus, $R_E$, $R_{E/t}$, and $R_t$ may be found:

$$R_E = \text{Range to Emitter} = \frac{\Delta t C \sin \Omega}{\sin \phi + \sin \theta - \sin \Omega} \tag{5}$$

$$R_E = \frac{\Delta t C \sin(\phi + \theta)}{\sin \phi + \sin \theta - \sin(\phi + \theta)}$$

$$R_t = \text{Range to Non-Emitter} = \frac{\Delta t C \sin \theta}{\sin \phi + \sin \theta - \sin \Omega} \tag{6}$$

$$R_t = \frac{\Delta t C \sin \theta}{\sin \phi + \sin \theta - \sin(\phi + \theta)}$$

$R_{E/t}$ = Range From Emitter to Non-Emitter (7)

$$R_{E/t} = \frac{\Delta t C \sin \phi}{\sin \phi + \sin \theta - \sin \Omega}$$

$$R_{E/t} = \frac{\Delta t C \sin \phi}{\sin \phi + \sin \theta - \sin(\phi + \theta)}$$

In Case II, we will be concerned with a non-constant scan rate or sector scanning and agile beam emitters at point C.

The passive location algorithm may be expanded to obtain range to emitters or non-emitters when the emitter scan rate is non-determinable by utilizing knowledge of any illuminated object's locations with respect to the measurement platform. The angle $\beta$ and the range to the emitter is first established as in Case I. Once the emitter location is known, locations of all non-emitters of interest may be established. The derivation of algorithms for determining the location of the emitter and non-emitters for Case II is as follows:

$$\sin\left(\frac{\alpha}{2}\right) = \sqrt{\frac{(s-b)(s-c)}{bc}}, \quad 2S = a + b + c$$

Relating to FIG. 1:

$2S = R_{E/t} + R_t + R_E$ $2S - 2R_E = R_{E/t} + R_t - R_E = \Delta R = \Delta t C$ $$S = \frac{\Delta t C}{2} + R_E \tag{1}$$

$$\sin\left(\frac{\phi}{2}\right) = \sqrt{\frac{\left(\frac{\Delta t C}{2} + R_E - R_E\right)\left(\frac{\Delta t C}{2} + R_E - R_t\right)}{R_E R_t}}$$

$$R_E R_t \sin^2\left(\frac{\phi}{2}\right) = \frac{\Delta t C}{2}\left(\frac{\Delta t C + 2R_E - 2R_t}{2}\right)$$

$$\frac{4 R_E R_t \sin^2\left(\frac{\phi}{2}\right)}{\Delta t C} = \Delta t C + 2R_E - 2R_t \tag{2}$$

Equation (2) may be solved for $R_E$ or $R_t$. Solving for $R_E$ (emitter location).

$$R_E\left[\frac{4R_t\sin^2\left(\frac{\phi}{2}\right) - 2\Delta t C}{\Delta t C}\right] = \Delta t C - 2R_t$$

$$R_E = \frac{\Delta t C(\Delta t C - 2R_t)}{4R_t\sin^2\left(\frac{\phi}{2}\right) - 2\Delta t C} = \text{Range to Emitter} \tag{3}$$

Solving for $R_t$ (illuminated object location):

$$R_t\left[\frac{4R_E\sin^2\left(\frac{\phi}{2}\right) + 2\Delta t C}{\Delta t C}\right] = \Delta t C + 2R_E$$

$$R_t = \frac{\Delta t C(\Delta t C + 2R_E)}{4R_E\sin^2\left(\frac{\phi}{2}\right) + 2\Delta t C} = \text{Range to Non-Emitter} \tag{4}$$

Figure 2:
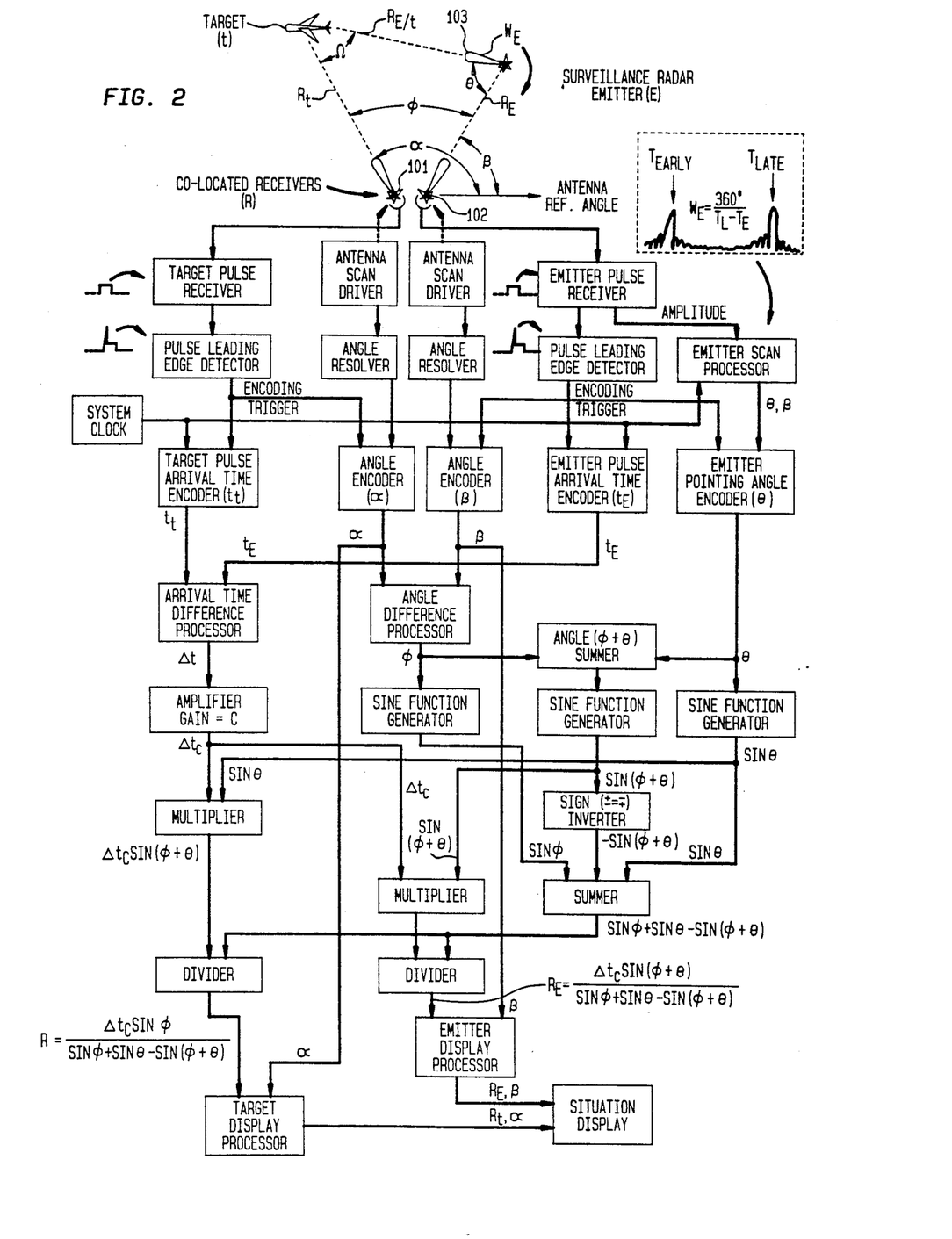
FIG. 2 is a schematic block diagram showing a mechanical antenna embodiment employing the concepts of the invention.

Referring now to FIG. 2, a schematic block diagram shows a simple implementation for obtaining monopulse type operation for location of emitting or non-emitting objects using a plurality of two located and mechanically driven antennas 101 and 102. These co-located receiver antennas may be in vertical juxtaposition, for example, such that their point of azimuth origin is the same. Independent emitter antenna 102 and target search antenna beams are thereby generated. The emitter beam is steered to dwell on the emitter during the location process. Data collected by the emitter pulse receiver is used to calculate the emitter pointing angle $\theta$ of the radar emitter 11 as a function of time identified as signal $A_E$. This is accomplished by accurately determining the times when main beam passage of an emitter beam 103 occurs. This establishes the emitter scan period letting $\tau = T_{early} - T_{late}$. The scan rate $(360° \div \tau \times \omega)$ may be computed and the emitter pointing angle $\theta$ which is a function of time $(\theta = T_{late} + \omega t)$ may be projected. Knowing the emitter pointing angle $\theta$, the target antenna 101 may be scanned through the space illuminated by the emitter 11. An emitter receiver and encoding mechanism 110 shown measures each direct path pulse event and also measures the bearings of targets illuminated by the location of the target antenna beam. Accordingly, the indicated angles and a target pulse arrival time signal $t_t$ and an emitter pulse arrival time signal $t_E$ and $\alpha$, $\Delta t$, $\Delta tC$, $\phi$, $\sin \phi$, $\sin \theta$, and $\sin (\phi + \theta)$ may be calculated the ultimately range to the emitter $R_e$ and the range to the target $R_t$ from the passive measurement radar system 10 as shown in FIG. 1 may be calculated and displayed. The implementation represented in the labeled blocks of FIG. 2 are instrumentable per se by those of skill in this art. The outputs are the values of $R_E$, $\beta$, $R_t$, and $\alpha$.

Figure 3:
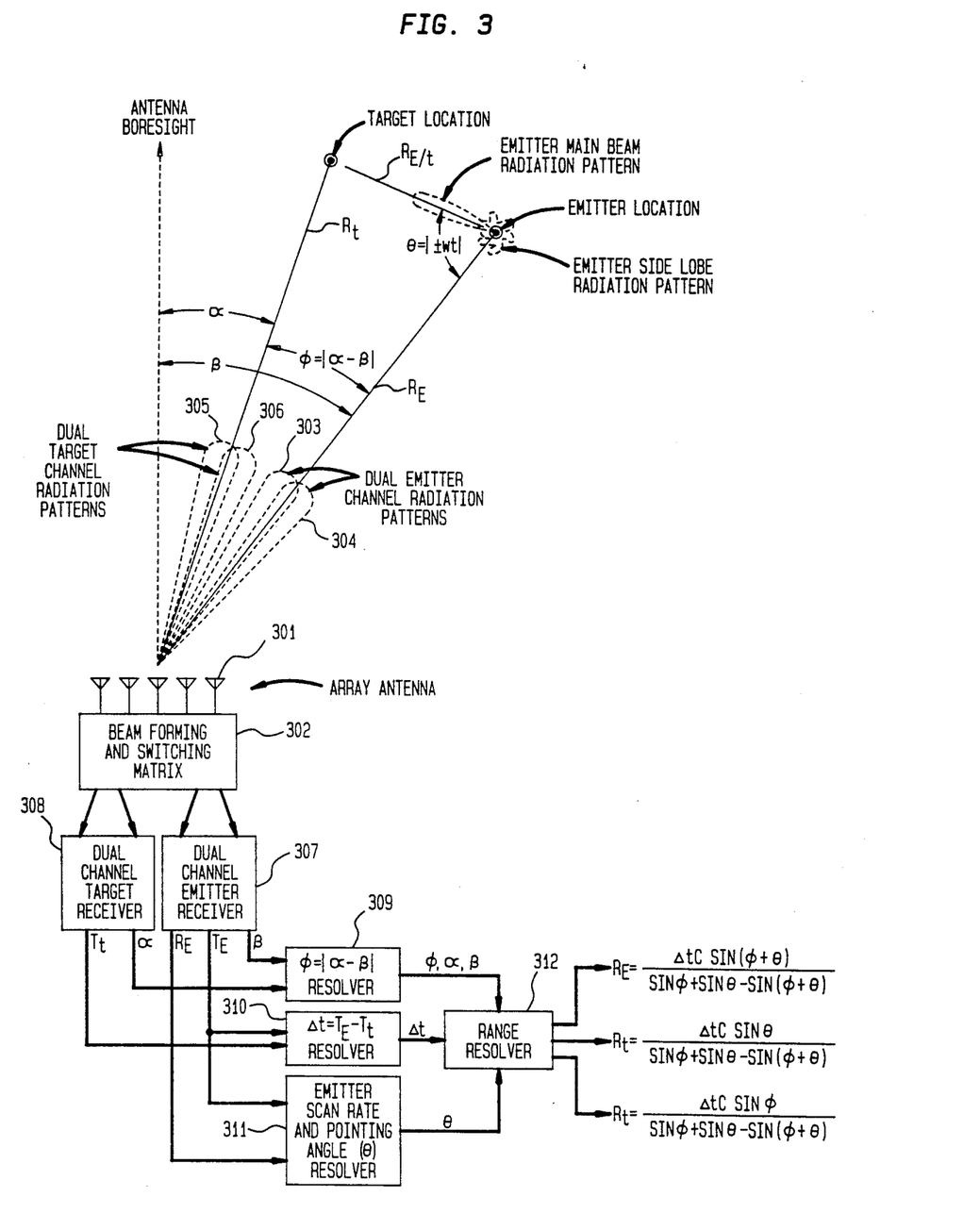
FIG. 3 is a passive purely electronic embodiment according to the invention in which a passive array and switching beam forming matrix is employed.

Referring now to FIG. 3, an electronic implementation employing an array antenna 301 with a beam forming and switching matrix 302 take the place of the mechanically positioned pencil beam antennas 101 and 102 from FIG. 2. The manner of forming a plurality of pairs of monopulse beams, such as beams 303 and 304 for an emitter directed receiving channel 307 and a target location beam pair 305 and 306 (also known as target channel radiation patterns), is also conventional in this art. The beam forming network 302 may be of the "Rotman lens" type providing a number of output ports each representative of a discrete receiving angle. A switching arrangement can provide for the connection of each of the receivers 307 and 308. The receiver outputs $T_t$, $\alpha$, $A_e$, $T_e$ and $\beta$ are connected as, shown among the resolvers 309, 310 and 311. These resolvers make the calculations indicated on FIG. 3, the resolver 309 providing the angles $\phi$, $\alpha$, and $\beta$ as an output, while resolver 310 calculates $\Delta t$ and resolver 311 calculates the angle $\theta$. Those resolver outputs are all fed to range resolver 312. The algorithms hereinbefore described are then applied to provide the range values $R_E$, $R_t$ and $R_{E/t}$.

From the understanding of the concepts of the invention, those of skill in this art will realize that using optical techniques in a comparable way can make the algorithms according to the invention applicable to surveying. Furthermore, using acoustic techniques, the algorithms may be applied for underwater usage.

From an understanding of the basic concepts of the invention, it will be realized by those of skill in this art that other applications as well as variations and modifications in the implementations of the invention are possible. Accordingly, it is not expected that the scope of the invention should be regarded as limited to the drawings or this description, these being intended to be typical and illustrative only.

What is claimed is:

1. A passive monopulse radar ranging system for determining the range of a scanning, emitting source and a reflecting object illuminated by said emitting source and angularly separated therefrom comprising, in combination:

an antenna array having a first plurality of ports providing a distribution or received energy phases as a function of an angle of arrival of a plurality of emitting source signals and a plurality of echo signals from said reflecting object;

a beam forming matrix responsive to said first plurality of ports and having a second plurality of ports, ports of said second plurality providing said emitting source signals and said echo signals to discrete ports of said second plurality of ports as a function of said angle of arrival at said antenna array;

emitter receiver means of said passive monopulse radar ranging system for receiving said emitting source signals from said beam forming matrix and for providing a time early output signal $T_E$ representing the arrival time of said emitting source signals, an output bearing angle $\beta$ of said emitting source signals with respect to an angular reference, and a signal $A_E$ representative of the scan rate of said emitting source, said emitting source scanning at a constant rate through 360°;

target receiver means of said passive monopulse radar ranging system for separately receiving said echo signals from said beam forming matrix and for providing a plurality of signals $T_t$ representing the arrival time of said echo signals, and for providing an angle $\alpha$ representative of the bearing angle of said reflecting object with respect to said angular reference;

first resolver means responsive to said $\alpha$ and $\beta$ angles for computing their difference $\phi$ representative of an angle between said emitting source and said reflecting object;

second resolver means responsive to said time early output signal $T_E$ and said echo signal arrival time $T_t$ for driving their difference $\Delta t$;

third resolver means responsive to said signal $A_E$ and said time early output signal $T_E$ for deriving a pointing angle $\theta$ of said emitting source toward said reflecting object with respect to a range line between said passive monopulse radar ranging system and said emitting source;

range resolver means responsive to said $\phi$, $\alpha$, $\beta$, $\Delta t$ and $\theta$ signals for generating a plurality of range signals $R_E$, $R_t$ and $R_{E/t}$, said range signal $R_E$ being between said passive monopulse radar ranging system and said emitting source, said range signal $R_t$ being between said passive monopulse radar ranging system and said reflecting object, and said range signal $R_{E/t}$ being between said emitting source and said reflecting object, said range resolver means solving the equations.

$$R_E = \frac{\Delta tC \sin(\phi + \theta)}{\sin\phi + \sin\theta - \sin(\phi + \theta)},$$

$$R_t = \frac{\Delta tC \sin\theta}{\sin\phi + \sin\theta - \sin(\phi + \theta)}, \text{ and}$$

$$R_{E/t} = \frac{\Delta tC \sin\phi}{\sin\phi + \sin\theta - \sin(\phi + \theta)}$$

said passive radar ranging system capable of accurately determining the location of said emitting source and said reflecting object in a monopulse scan of said emitting source, said antenna array arranged to provide dual, angularly overlapping beam patterns while said emitter receiver means and said target receiver means being arranged to provide monopulse operation employing said dual beam patterns.

2. A passive monopulse radar ranging system for determining the range of a scanning, emitter source and a reflecting object illuminated by said emitting source and angularly separated therefrom comprising, in combination;

an antenna array having a first plurality of ports providing a distribution of received energy phases as a function of an angle of arrival of a plurality of emitting source signals and a plurality of echo signals from said reflecting object;

a beam forming matrix responsive to said first plurality of ports and having a second plurality of ports, ports of said second plurality of providing said emitting source signals and said echo signals to discrete ports of said second plurality of ports as a function of said angle of arrival at said antenna array;

emitter receiver means of said passive monopulse radar ranging system for receiving said emitting source signals from said beam forming matrix and for providing a time early output signal $T_E$ representing the arrival time of said emitting source signals, an output bearing angle $\beta$ of said emitting source signals with respect to an angular reference, and a signal $A_E$ representative of the scan rate of said emitting source, said emitting source scanning at a non-constant rate through sectors of 360°;

target receiver means of said passive monopulse radar ranging system for separately receiving said echo signals from said beam forming matrix and for providing a plurality of signals $T_t$ representing the arrival time of said echo signals, and for providing an angle $\alpha$ representative of the bearing angle of said reflecting object with respect to said angular reference;

first resolver means responsive to said $\alpha$ and $\beta$ angles for computing their difference $\phi$ representative of an angle between said emitting source and said reflecting object;

second resolver means responsive to said time early output signal $T_E$ and said echo signal arrival time $T_t$ for deriving their difference $\Delta t$;

third resolver means responsive to said signal $A_E$ and said time early output signal $T_E$ for deriving a pointing angle $\theta$ of said emitting source toward said reflecting object with respect to a range line between said passive monopulse radar ranging system and said emitting source; and range resolver means responsive to said $\phi$, $\alpha$, $\beta$, $\Delta t$ and $\theta$ signals for generating a plurality of range signals $R_E$, $R_t$ and $R_{E/t}$, said range signal $R_E$ being between said passive monopulse radar ranging system and said emitting source, said range signal $R_t$ being between said passive monopulse radar ranging system and said reflecting object, and said range signal $R_{E/t}$ being between said emitting source and said reflecting object, said range resolver means solving the equations.

$$R_E = \frac{\Delta t C(\Delta t C - 2R_t)}{4R_t \mathrm{SIN}^2(\phi/2) - 2\Delta t C}$$

and $$R_t = \frac{\Delta t C(\Delta t C + 2R_E)}{4R_E \mathrm{SIN}^2(\phi/2) + 2\Delta t C}$$

said passive radar ranging system capable of accurately determining the location of said emitting source and said reflecting object in a monopulse scan of said emitting source, said antenna array arranged to provide dual, angularly overlapping beam patterns while said emitter receiver means and said target receiver means being arranged to provide monopulse operation employing said dual beam patterns.

3. A passive monopulse radar ranging system for determining the range of a scanning, emitting source and a reflecting object illuminated by said emitting source and angularly separated thereform comprising, in combination:

antenna means having a first plurality of ports providing a distribution of received energy phases as a function of an angle of arrival of a plurality of emitting source signals and a plurality of echo signals from said reflecting object;

a beam forming matrix responsive to said first plurality of ports and having a second plurality of ports, ports of said second plurality providing said emitting source signals and said echo signals to discrete ports of said second plurality of ports as a function of said angle of arrival at said antenna means;

emitter receiver means of said passive monopulse radar ranging system for receiving said emitting source signals from said beam forming matrix and for providing a time early output signal $T_E$ representing the arrival time of said emitting source signals, an output bearing angle $\beta$ of said emitting source signals with respect to an angular reference, and a signal $A_E$ representative of the scan rate of said emitting source, said emitting source scanning at a constant rate through 360°;

target receiver means of said passive monopulse radar ranging system for separately receiving said echo signals from said beam forming matrix and for providing a plurality of signals $T_t$ representing the arrival time of said echo signals, and for providing an angle $\alpha$ representative of the bearing angle of said reflecting object with respect to said angular reference;

first resolver means responsive to said $\alpha$ and $\beta$ angles for computing their difference $\phi$ representative of an angle between said emitting source and said reflecting object;

second resolver means responsive to said time early output signal $T_E$ and said echo signal arrival time $T_t$ for deriving their difference $\Delta t$;

third resolver means responsive to said signal $A_E$ and said time early output signal $T_E$ for deriving a pointing angle $\theta$ of said emitting source toward said reflecting object with respect to a range line between said passive monopulse radar ranging system and said emitting source; and range resolver means responsive to said $\phi$, $\alpha$, $\beta$, $\Delta t$ and $\theta$ signals for generating a plurality of range signals $R_E$, $R_t$ and $R_{E/t}$, said range signal $R_E$ being between said passive monopulse radar ranging system and said emitting source, said range signal $R_t$ being between said passive monopulse radar ranging system and said reflecting object, and said range signal $R_{E/t}$ being between said emitting source and said reflecting object, said range resolver means solving the equations $$R_E = \frac{\Delta t C \mathrm{Sin}(\phi + \theta)}{\mathrm{Sin}\phi + \mathrm{Sin}\theta - \mathrm{Sin}(\phi + \theta)}$$

$$R_t = \frac{\Delta t C \mathrm{Sin}\theta}{\mathrm{Sin}\phi + \mathrm{Sin}\theta - \mathrm{Sin}(\phi + \theta)}, \text{ and}$$

-continued $$R_{E/t} = \frac{\Delta tC\sin\phi}{\sin\phi + \sin\theta - \sin(\phi + \theta)}$$

said passive radar ranging system capable of accurately determining the location of said emitting source and said reflecting object in a monopulse scan of said emitting source, said antenna means having at least a pair of driven antennas arranged to provide angularly independent beam patterns while said emitter receiver means and said target receiver means being arranged to provide monopulse operation employing said independent beam patterns.

4. A passive monopulse radar ranging system for determining the range of a scanning, emitting source and a reflecting object illuminated by said emitting source and angularly separated therefrom comprising, in combination:

antenna means having a first plurality of ports providing a distribution of received energy phases as a function of an angle of arrival of a plurality of emitting source signals and a plurality of echo signals from said reflecting object;

a beam forming matrix responsive to said first plurality of ports and having a second plurality of ports, ports of said second plurality providing said emitting source signals and said echo signals to discrete ports of said second plurality of ports as a function of said angle of arrival at said antenna means;

emitting receiver means of said passive monopulse radar ranging system for receiving said emitting source signals from said beam forming matrix and for providing a time early output signal $T_E$ representing the arrival time of said emitting source signals, an output bearing angle $\beta$ of said emitting source signals with respect to an angular reference, and a signal $A_E$ representative of the scan rate of said emitting source, said emitting source scanning at a non-constant rate through sectors of 360°;

target receiver means of said passive monopulse radar ranging system for separately receiving said echo signals from said beam forming matrix and for providing a plurality of signals $T_t$ representing the arrival time of said echo signals, and for providing an angle $\alpha$ representative of the bearing angle of said reflecting object with respect to said angular reference;

first resolver means responsive to said $\alpha$ and $\beta$ angles for computing their difference $\phi$ representative of an angle between said emitting source and said reflecting object;

second resolver means responsive to said time early output signal $T_E$ and said echo signal arrival time $T_t$ for deriving their difference $\Delta t$;

third resolver means responsive to said signal $A_E$ and said time early output signal $T_E$ for deriving a pointing angle $\theta$ of said emitting source toward said reflecting object with respect to a range line between said passive monopulse radar ranging system and said emitting source; and range resolver means responsive to said $\phi$, $\alpha$, $\beta$, $\Delta t$ and $\theta$ signals for generating a plurality of range signals $R_E$, $R_t$ and $R_{E/t}$, said range signal $R_E$ being between said passive monopulse radar ranging system and said emitting source, said range signal $R_t$ being between said passive monopulse radar ranging system and said reflecting object, and said range signal $R_{E/t}$ being between said emitting source and said reflecting object, said range resolver means solving the equations.

$$R_E = \frac{\Delta tC(\Delta tC - 2R_t)}{4R_t\text{SIN}^2(\phi/2) - 2\Delta tC}$$

and $$R_t = \frac{\Delta tC(\Delta tC + 2R_E)}{4R_E\text{SIN}^2(\phi/2) + 2\Delta tC}$$

said passive radar ranging system capable of accurately determining the location of said emitting source and said reflecting object in a monopulse scan of said emitting source, said antenna means having at least a pair of driven antennas arranged to provide angularly independent beam patterns while said emitter receiver means and said target receiver means being arranged to provide monopulse operation employing said independent beam patterns.

5. A method for passively determining the location in range and azimuth of a number of objects from a platform comprising:

receiving a first electromagnetic energy signal from a first object, said first object emitting energy over a scan angle A during a scan period P, said first energy signal traversing a path $R_3$ from said first object to said platform, said energy signal arriving at the platform at time $T_1$ and at an angle of arrival $B_1$, said energy signal traversing path $R_3$ during a time $t_1$;

receiving an electromagnetic energy signal echo from a second object, said echo traversing a path $R_1$ from said second object to said platform, said echo arriving at said platform at time $T_2$ and at an angle af arrival $B_2$, said echo being reflection of electromagnetic energy traversing a path $R_2$ from said first object to said second object said energy traversing path $R_2$ and said echo traversing path $R_1$ during a combined time $t_2$;

determining an angle $\theta$ subtended by path $R_2$;

determining an angle $\phi$ subtended by path $R_1$;

determining a difference, t, in time said t being $t_2 - T_1$; and utilizing said angles $\theta$ and $\phi$ and said difference t in time to determine a distance from said platform to said first object along path $R_3$, a distance from said platform to said second object along path $R_1$, a distance from said first object to said second object along path $R_2$.

6. The method of claim 3 wherein the step of determining an angle $\theta$ subtended by path $R_2$ comprises calculating the difference between said angle of arrival $B_1$ of said first energy signal and said angle of arrival $B_2$ of said energy signal echo.

7. The method of claim 3 wherein the step of determining an angle $\phi$ subtended by path $R_1$ comprises solving for $\phi$ according to $$\theta = [(T_2 - T_1)A]/P.$$

8. The method of claim 3 wherein the step of utilizing said angles $\theta$ and $\phi$ and said difference t in time to determine distances along paths $R_3$, $R_1$ and $R_2$, comprises determining $$CT = (R_1 + R_2) - R_3$$

where

C = velocity of light t being in microseconds $$R_1/\sin\phi = R_2/\sin\theta = R_3/\sin(\theta + \phi)$$
$$R_1 = \frac{\text{for yielding}}{1 + (\sin\theta/\sin\phi) - [\sin(\theta + \phi)/\sin\phi]}$$

$R_2 = R_1 (\sin\theta/\sin\phi)$
$R_3 = R_1 [\sin(\theta + \phi)/\sin\phi]$.

* * * * *

UNITED STATES PATENT AND TRADEMARK OFFICE
CERTIFICATE OF CORRECTION

PATENT NO. : 5,280,294

DATED : January 18, 1994

INVENTOR(S) : Hammerquist

It is certified that error appears in the above-identified patent and that said Letters Patent is hereby corrected as shown below:

In Claim 6, column 10, line 52 of the Patent, after the word "claim" delete "3" and substitute -- 5 -- therefor.

In Claim 7, column 10, line 57 of the Patent, after the word "claim" delete "3" and substitute -- 5 -- therefor.

In Claim 8, column 10, line 63 of the Patent, after the word "claim" delete "3" and substitute -- 5 -- therefor.

Signed and Sealed this

First Day of November, 1994

*Attest:*

BRUCE LEHMAN

*Attesting Officer*    *Commissioner of Patents and Trademarks*